US011931977B2

(12) United States Patent
Costa et al.

(10) Patent No.: US 11,931,977 B2
(45) Date of Patent: Mar. 19, 2024

(54) MULTI-CORE POLYMER OPTICAL FIBRE AND THE FABRICATION THEREOF

(71) Applicant: Microsoft Technology Licensing, LLC, Redmond, WA (US)

(72) Inventors: Paolo Costa, London (GB); Gilberto Brambilla, Southampton (GB); Kai Shi, Cambridge (GB); Hitesh Ballani, Cambridge (GB); Richard James Baca, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/710,952

(22) Filed: Mar. 31, 2022

(65) Prior Publication Data

US 2023/0311438 A1 Oct. 5, 2023

(51) Int. Cl.
| | |
|---|---|
| *B29D 11/00* | (2006.01) |
| *G02B 6/02* | (2006.01) |
| *G02B 6/028* | (2006.01) |

(52) U.S. Cl.
CPC .. *B29D 11/00721* (2013.01); *B29D 11/00682* (2013.01); *G02B 6/02033* (2013.01); *G02B 6/02042* (2013.01); *G02B 6/0286* (2013.01)

(58) Field of Classification Search
CPC .................. B29D 11/00682; B29D 11/00721
See application file for complete search history.

(56) References Cited

U.S. PATENT DOCUMENTS

| | | | |
|---|---|---|---|
| 5,557,693 A | 9/1996 | Stevens et al. | |
| 5,760,139 A * | 6/1998 | Koike | B29C 39/006 |
| | | | 525/200 |
| 5,783,636 A * | 7/1998 | Koike | B29C 39/006 |
| | | | 525/200 |
| 6,367,989 B1 | 4/2002 | Hartman et al. | |
| (Continued) | | | |

FOREIGN PATENT DOCUMENTS

| | | |
|---|---|---|
| EP | 3848931 A1 | 7/2021 |
| FR | 2761482 A1 | 10/1998 |
| (Continued) | | |

OTHER PUBLICATIONS

"Communication channel", Retrieved from: https://en.wikipedia.org/w/index.php?title=Communication_channel&oldid=1042370128, Sep. 4, 2021, 5 Pages.
(Continued)

*Primary Examiner* — Rhonda S Peace
(74) *Attorney, Agent, or Firm* — Barta, Jones & Foley, PLLC

(57) ABSTRACT

A method of fabricating a multi-core polymer optical fibre comprises arranging optical fibre preforms in a stack, the optical fibre preforms each comprising a polymer core and polymer cladding surrounding the polymer core; and drawing and bonding the stack to form the multi-core polymer optical fibre. Any contaminants or impurities which collect on outer surfaces of the preforms may be confined to boundaries between the preforms, which may avoid attenuation of signals passed through the cores while at the same time reducing crosstalk between cores of the final manufactured fibre. Also provided is a multi-core polymer optical fibre obtainable by the method.

20 Claims, 2 Drawing Sheets

(56) References Cited

U.S. PATENT DOCUMENTS

| | | | |
|---|---|---|---|
| 6,606,175 B1 | 8/2003 | Sampsell et al. | |
| 6,628,874 B1* | 9/2003 | Sugawara | G02B 6/02042 |
| | | | 385/115 |
| 8,116,606 B2* | 2/2012 | Sugawara | G02B 6/03694 |
| | | | 385/116 |
| 8,326,105 B2 | 12/2012 | Imamura | |
| 9,052,433 B2* | 6/2015 | Dianov | G02B 6/02042 |
| 9,207,398 B2* | 12/2015 | Gibson | C03B 37/01288 |
| 9,335,467 B2* | 5/2016 | Kokubun | G02B 6/02042 |
| 9,841,556 B2 | 12/2017 | Butler et al. | |
| 9,864,150 B2 | 1/2018 | Sasaki et al. | |
| 2002/0105102 A1 | 8/2002 | Blyler et al. | |
| 2003/0190130 A1* | 10/2003 | Welker | G02B 6/3885 |
| | | | 264/1.29 |
| 2004/0113297 A1* | 6/2004 | Cho | G02B 1/046 |
| | | | 264/1.29 |
| 2004/0208439 A1 | 10/2004 | Bell et al. | |
| 2004/0238977 A1 | 12/2004 | Ilyashenko | |
| 2005/0036731 A1 | 2/2005 | Maxwell | |
| 2005/0041944 A1* | 2/2005 | Cryan | G02B 6/02352 |
| | | | 385/124 |
| 2005/0157999 A1 | 7/2005 | Zhen et al. | |
| 2006/0034613 A1 | 2/2006 | Morris et al. | |
| 2007/0128749 A1 | 6/2007 | Van et al. | |
| 2009/0067793 A1 | 3/2009 | Bennett et al. | |
| 2011/0096570 A1 | 4/2011 | Vissenberg | |
| 2012/0027369 A1 | 2/2012 | Yoshida et al. | |
| 2012/0114291 A1 | 5/2012 | Yoshida et al. | |
| 2013/0298380 A1 | 11/2013 | Mukasa | |
| 2014/0003776 A1* | 1/2014 | Gibson | C03B 37/01288 |
| | | | 385/116 |
| 2014/0010501 A1 | 1/2014 | Saito et al. | |
| 2014/0199039 A1* | 7/2014 | Kokubun | G02B 6/46 |
| | | | 29/428 |
| 2015/0063755 A1 | 3/2015 | Doany et al. | |
| 2015/0378092 A1 | 12/2015 | Bookbinder et al. | |
| 2016/0299289 A1 | 10/2016 | Bookbinder et al. | |
| 2016/0349447 A1 | 12/2016 | Butler et al. | |
| 2017/0205572 A1 | 7/2017 | Nichol | |
| 2018/0051161 A1 | 2/2018 | Tam et al. | |
| 2019/0101693 A1 | 4/2019 | Cao et al. | |
| 2020/0209466 A1 | 7/2020 | Sanborn et al. | |
| 2021/0055472 A1 | 2/2021 | Bretschneider | |
| 2021/0271018 A1 | 9/2021 | White et al. | |
| 2023/0121772 A1 | 4/2023 | Bennett et al. | |
| 2023/0314695 A1 | 10/2023 | Costa et al. | |
| 2023/0314696 A1 | 10/2023 | Costa et al. | |

FOREIGN PATENT DOCUMENTS

| | | | |
|---|---|---|---|
| JP | 2010286548 A | | 12/2010 |
| JP | 6153447 B2 * | | 6/2017 |
| KR | 20040026766 A | | 4/2004 |
| WO | 9946619 A1 | | 9/1999 |
| WO | 2016153508 A1 | | 9/2016 |

OTHER PUBLICATIONS

"Fiber-optic communication", Retrieved from: https://en.wikipedia.org/w/index.php?title=Fiber-optic_communication&oldid=1043741505, Sep. 11, 2021, 16 Pages.

"Fibre Optic Transmitters", Retrieved from: https://uk.rs-online.com/web/c/displays-optoelectronics/fibre-optic-components/fibre-optic-transmitters/, Retrieved Date: Sep. 21, 2021, 6 Pages.

"Heuristic (computer science)", Retrieved from: https://en.wikipedia.org/w/index.php?title=Heuristic_(computer_science)&oldid=1039350744, Aug. 18, 2021, 4 Pages.

"Multiplexing", Retrieved from: https://en.wikipedia.org/w/index.php?title=Multiplexing&oldid=1039656111, Aug. 19, 2021, 6 Pages.

"Vertical-cavity surface-emitting laser", Retrieved from: https://en.wikipedia.org/w/index.php?title=Vertical-cavity_surface-emitting_laser&oldid=1032729016, Jul. 9, 2021, 6 Pages.

"Wavelength-division multiplexing", Retrieved from: https://en.wikipedia.org/w/index.php?title=Wavelength-division_multiplexing&oldid=1043756516, Sep. 11, 2021, 8 Pages.

"Search Report Issued in European Patent Application No. 21196676.7", dated Apr. 4, 2022, 10 Pages.

"Acrylate Polymer", Retrieved from: https://en.wikipedia.org/wiki/Acrylate_polymer, Mar. 2, 2022, 2 Pages.

"Attenuation", Retrieved from: https://en.wikipedia.org/wiki/Attenuation#Optics, Mar. 11, 2022, 8 Pages.

"Borescope", Retrieved from: https://en.wikipedia.org/wiki/Borescope, Sep. 23, 2021, 3 Pages.

"Cladding (Fiber Optics)", Retrieved from: https://en.wikipedia.org/wiki/Cladding_(fiber_optics), Feb. 9, 2022, 3 Pages.

"Modal Dispersion", Retrieved from: https://en.wikipedia.org/wiki/Modal_dispersion, Feb. 6, 2022, 2 Pages.

"Multi-Mode Optical Fiber", Retrieved from: https://en.wikipedia.org/wiki/Multi-mode_optical_fiber, Jan. 31, 2022, 3 Pages.

"Plastic Optical Fiber", Retrieved from: https://en.wikipedia.org/wiki/Plastic_optical_fiber, Feb. 9, 2022, 4 pages.

"Poly(Methyl Methacrylate)", Retrieved from: https://en.wikipedia.org/wiki/Poly(methyl_methacrylate), Mar. 29, 2022, 14 Pages.

"Polycarbonate", Retrieved from: https://en.wikipedia.org/wiki/Polycarbonate, Mar. 4, 2022, 12 Pages.

"Polystyrene", Retrieved from: https://en.wikipedia.org/w/index.php?title=Polystyrene&oldid=1079666750, Mar. 28, 2022, 23 Pages.

"Research Lines", Retrieved from: https://web.archive.org/web/20150331225712/https://www.ehu.eus/en/web/appliedphotonicsbilbao/research-lines, Mar. 31, 2015, 2 Pages.

"Spinning (Polymers)", Retrieved from: https://en.wikipedia.org/wiki/Spinning_(polymers), Mar. 25, 2022, 3 Pages.

"Square-Core Multimode Fiber", Retrieved from: https://web.archive.org/web/20201023122431/https://www.thorlabs.com/newgrouppage9.cfm?objectgroup_id=10637, Oct. 23, 2020, 2 Pages.

"Sumitomo Electric Has Developed Coupled Multi-Core Optical Fiber Suitable for Ultra-Long-Haul Transmission", Retrieved from: https://global-sei.com/company/press/2016/03/prs023.html, Mar. 25, 2016, 2 Pages.

"Toslink", Retrieved from: https://en.wikipedia.org/wiki/TOSLINK, Mar. 24, 2022, 4 Pages.

Abe, et al., "Multi-Core Fiber Connector Technology for Low-Loss Physical-Contact Connection", In Journal of NTT Technical Review, vol. 15, Issue 6, Jun. 2017, 6 Pages.

Anuszkiewicz, et al., "Fused Silica Optical Fibers with Graded Index Nanostructured Core", In Journal of Scientific Reports, vol. 8, Issue 1, Aug. 17, 2018, 13 Pages.

Bhowmik, et al., "Polymer Optical Fibers", In Handbook of Optical Fibers, Mar. 2019, 51 Pages.

Fasano, et al., "Fabrication and Characterization of Polycarbonate Microstructured Polymer Optical Fibers for High-Temperature-Resistant Fiber Bragg Grating Strain Sensors", In Journal of Optical Materials Express, vol. 6, Issue 2, Jan. 27, 2016, 11 Pages.

Ishigure, et al., "Optimum Refractive-Index Profile of the Graded-Index Polymer Optical Fiber, Toward Gigabit Data Links", In Journal of Applied Optics, vol. 35, Issue 12, Apr. 20, 1996, pp. 2048-2053.

Jung, et al., "High Spatial Density 6-Mode 7-Core Fiber Amplifier for L-band Operation", In Journal of Lightwave Technology, vol. 38, Issue 11, Jun. 1, 2020, pp. 2938-2943.

Narro-Garcia, et al., "Polymer Optical Fiber with Rhodamine Doped Cladding for Fiber Light Systems", In Journal of Luminescence, vol. 169, Part A, Jan. 2016, pp. 295-300.

Paschotta, Rudiger, "Double-clad Fibers", Retrieved from: https://web.archive.org/web/20220111005727/https://www.rp-photonics.com/double_clad_fibers.html, Jan. 11, 2022, 10 Pages.

Paschotta, Rudiger, "Fiber Preforms", Retrieved from: https://web.archive.org/web/20211031034456/http://www.p-photonics.com/fiber_preforms.html, Oct. 31, 2021, 7 Pages.

Stajanca, et al., "Solution-Mediated Cladding Doping of Commercial Polymer Optical Fibers", In Journal of Optical Fiber Technology, vol. 41, Mar. 1, 2018, pp. 227-234.

Weber, Austin, "Positioning for Fiber Optics Assembly", Retrieved from: https://www.assemblymag.com/articles/83597-positioning-for-fiber-optics-assembly, May 1, 2001, 9 Pages.

(56) References Cited

OTHER PUBLICATIONS

Zafeiropoulou, et al., "Curvature Sensing with a D-Shaped Multicore Fibre and Brillouin Optical Time-Domain Reflectometry", In Journal of Optics Express, vol. 28, Issue 2, Jan. 20, 2020, pp. 1291-1299.
Zafeiropoulou, et al., "D-Shaped Multicore Fibre for Distributed Curvature Sensing with BOTDR", In Proceedings of Optical Sensors and Sensing Congress, Jun. 22, 2020, 2 Pages.
Zafeiropoulou, et al., "Flat Multi-Core Fibre for Twist Elimination in Distributed Curvature Sensing", In Journal of Optical Fiber Technology, vol. 66, Oct. 2021, 6 Pages.
"Application as Filed in European Patent Application No. 21196676.7", Filed Date: Sep. 14, 2021, 26 Pages.
"International Search Report and Written Opinion Issued in PCT Application No. PCT/US23/013175", dated May 19, 2023, 14 Pages.
"International Search Report and Written Opinion Issued in PCT Application No. PCT/US23/010882", dated May 9, 2023, 12 Pages.
"Office Action issued in U.S. Appl. No. 17/710,926", dated Mar. 24, 2023, 10 Pages.
"Office Action issued in U.S. Appl. No. 17/710,961", dated Mar. 24, 2023, 10 Pages.
"International Search Report and Written Opinion Issued in PCT Application No. PCT/US2023/013176", dated Jun. 22, 2023, 12 Pages.
"Final Office Action Issued in U.S. Appl. No. 17/710,926", dated Sep. 7, 2023, 10 Pages.
"Final Office Action Issued In U.S. Appl. No. 17/710,961", dated Sep. 6, 2023, 11 Pages.
Non-Final Office Action dated Dec. 29, 2023, in U.S. Appl. No. 17/710,926, 10 pages.
Non-Final Office Action dated Dec. 29, 2023, in U.S. Appl. No. 17/710,961, 11 pages.

* cited by examiner

MULTI-CORE POLYMER OPTICAL FIBRE AND THE FABRICATION THEREOF

BACKGROUND

An optical fibre comprises a core surrounded by cladding. In refractive index guiding fibres, the core has a refractive index which is greater than that of cladding. The optical fibre thus acts as a waveguide, with light being confined to the core by total internal reflection.

The core and cladding each comprise optically transparent materials, generally silicates or an organic polymer such as poly(methyl methacrylate) ("PMMA"). An optical fibre in which the cladding and the core are both formed from organic polymers are referred to as "polymer optical fibres", often abbreviated as "POF". POFs may be cheaper to manufacture than silica-based optical fibres, and may be less fragile and easier to handle.

The boundary between the core and cladding may be an abrupt material boundary. Optical fibres with an abrupt boundary between the core and cladding are referred to as "step-index optical fibres". Alternatively, the transition between the core and the cladding may be more gradual. Optical fibres with a gradual transition between the core and the cladding are referred to as "graded-index optical fibres".

Optical fibres are widely used in communications systems. Data may be encoded in pulses of light which are transmitted along the optical fibres. Fibre-optic communication systems are used in a variety of contexts to transfer information, such as for telephone and internet communication, as well as for broadcasting television signals. Fibre optic communication systems are also widely used for intra-datacentre connectivity, where emerging workloads such as machine learning and resource disaggregation are significantly increasing network demands.

Optical fibres are also used in optical instruments, e.g. in boroscopes (also referred to as borescopes or fibrescopes) and endoscopes. These instruments make use of optical fibres to allow visual inspection of otherwise-inaccessible targets.

SUMMARY

In one aspect, there is provided a method of fabricating a multi-core polymer optical fibre. The method comprises arranging optical fibre preforms in a stack, the optical fibre preforms each comprising a polymer core and polymer cladding surrounding the polymer core; and drawing and bonding the stack to form the multi-core polymer optical fibre. Any contaminants or impurities which collect on outer surfaces of the preforms may be confined to boundaries between the preforms, which may avoid attenuation of signals passed through the cores while at the same time reducing crosstalk between cores of the final manufactured fibre.

Another aspect provides multi-core polymer optical fibre comprising cores embedded in cladding. The multi-core polymer optical fibre further comprises particulate material embedded in the cladding. Each of the cores is surrounded by respective first and second regions of cladding. The first region is substantially free of the particulate material. The second region is spaced from the core by the first region. The second region includes the particulate material. At least part of the second region being arranged between the core and one or more adjacent cores. The multi-core polymer optical fibre is obtainable by the methods provided herein. The particulate material may reduce crosstalk between adjacent ones of the cores.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

Figure 1:
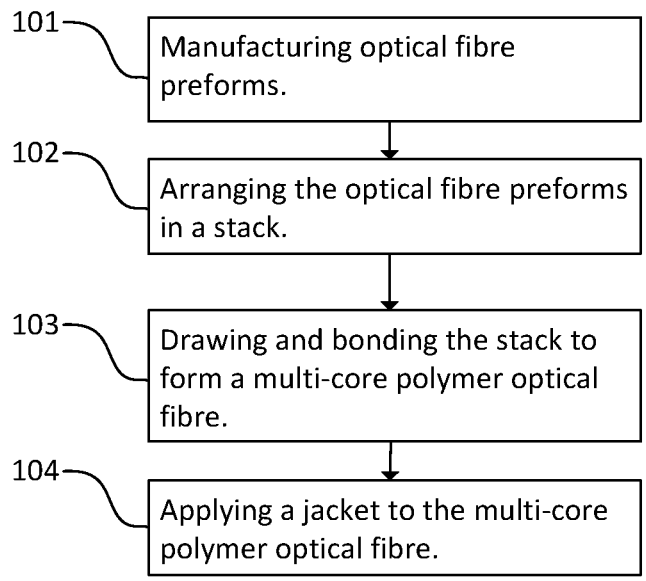
FIG. 1 is a flow diagram outlining an example method of fabricating a multi-core polymer optical fibre.

It should be noted that the drawings are not to scale.

DETAILED DESCRIPTION

The verb 'to comprise' is used herein as shorthand for 'to include or to consist of'. In other words, although the verb 'to comprise' is intended to be an open term, the replacement of this term with the closed term 'to consist of' is explicitly contemplated, particularly where used in connection with chemical compositions.

Directional terms such as "top", "bottom", "left", "right", "above", "below", "horizontal" and "vertical" are used herein for convenience of description and relate to the orientation illustrated in the relevant drawing. For the avoidance of any doubt, this terminology is not intended to limit orientation in an external frame of reference.

Geometrical terms such as "triangular", "square", and "hexagonal" are used herein for convenience of description. As will be appreciated, in practice, shapes of components may vary within manufacturing tolerances.

The term "polymer" is used herein as shorthand for "organic polymer". Silicates are not considered to be polymers in the present context.

A "multi-core" optical fibre is an optical fibre including at least two cores, often ten or more cores.

All "cross-sections" are taken perpendicular to the length of the direction of the optical fibre or optical fibre preform, unless otherwise stated. The length direction is the direction in which the optical fibre preforms will be drawn, and in which light will propagate along the optical fibre.

A region of cladding may be considered "substantially free" of particulate material when that region comprises no more particulate material than would be present in the bulk of the cladding material as synthesized. For example, a region of cladding which is substantially free of particulate material may comprise no more than 500 ppm by weight of particulate material.

Provided herein is a method of fabricating a low-loss multi-core polymer optical fibre, and a multi-core polymer optical fibre obtainable by the method.

The attenuation, or loss, of an optical fibre depends on the quality of materials used, and on the quantity and nature of any impurities or defects. Impurities in the core of the optical fibre strongly contribute to signal loss. Conversely, impurities at the outer edges of the cladding, far from the centre of the optical fibre, have a negligible impact because an extremely small proportion of the light will interact with those remote regions.

Described herein is the stacking of optical fibre preforms to produce a larger size optical fibre preform with multiple cores, which is then drawn to produce the multi-core optical fibre.

Stacking preforms may allow contaminants and impurities to be confined at interfaces between the preforms, far away from where light will propagate in the finished optical fibre. This may significantly reduce the effects of the contaminants and impurities in regions on fibre attenuation. Since the presence of impurities is well-tolerated, the methods provided herein do not require the use of a cleanroom. This may potentially reduce manufacturing costs significantly.

The preforms may have a tileable cladding geometry. The use of stackable cladding geometries may allow cores to be arranged reliably at predefined positions. Consistent positioning of cores may allow for passive alignment of the cores with transmitters/receivers during installation of the optical fibre. This may allow for rapid deployment of the optical fibres.

An example method of fabricating a multi-core optical fibre will now be described with reference to FIG. 1. FIG. 1 is a flow diagram outlining the method.

At block 101, a plurality of optical fibre preforms is manufactured. An optical fibre preform is an intermediate product which is capable of being converted into an optical fibre by a fibre drawing process.

An optical fibre preform has a thickness which is greater than that of a finished optical fibre, and a length which is less than that of a finished optical fibre. By way of illustration, an optical fibre preform may have a thickness of greater than or equal to 2 cm, e.g. 2 to 30 cm, and a length of less than 500 cm, e.g. 30 to 500 cm. In contrast, an optical fibre may have a thickness of less than or equal to 1 mm and a length of 1 m or more.

An optical fibre preform comprises a core and one or more layers of cladding surrounding the core.

The core comprises a material with a higher refractive index than that of the cladding. Once drawn into an optical fibre, this allows for propagation of light signals along the length of the fibre by total internal reflection. In the methods described herein, the core and the cladding each comprise organic polymers.

The organic polymers may be selected as appropriate. Any organic polymer which transmits light at a target wavelength and which can be drawn into a fibre may be used. The organic polymers are typically organic thermoplastic polymers. Illustrative examples of organic polymers useful for forming cores of polymer optical fibres include polyacrylates, such as poly(methyl methacrylate); polyethylene; polystyrenes; polycarbonates; poly(perfluorobutylene vinyl ether); and cyclic olefin copolymers. Examples of organic polymers useful for forming cladding include halogenated polymers, such as fluoropolymers and chloropolymers. Fluoropolymers typically have a lower refractive indices than chloropolymers. Examples of useful fluoropolymers include poly(fluoroalkyl methacrylate), poly(vinylidene fluoride), and poly(perfluoro-butenylvinyl ether).

At least one of the core and the cladding may include a dopant. A dopant is a compound which modifies the refractive index of the material.

When the cladding includes a dopant, the dopant may be an oligomer, in particular a chlorinated or fluorinated oligomer.

Illustrative examples of core dopants include diphenyl sulfide, diphenyl sulfoxide, tricresyl phosphate, benzyl benzoate, triphenyl phosphate, dyes or nanoparticles.

The core is typically a solid core, but the use of microstructured cores is also contemplated. A microstructured core includes a pattern of holes for modifying the refractive index of the core.

The cross-sectional shape of the optical fibre preforms is not particularly limited and may be selected as appropriate. For example, cylindrical optical fibre preforms may be used. Drawing and bonding a stack of optical fibre preforms may cause reflow of the cladding material, which may fill in gaps between preforms.

The optical fibre preforms may have a tileable shape. When viewed end-on or, equivalently, in a cross-section taken perpendicular to the length direction of the core, the outermost edges of the optical fibre preform may form a tileable shape. In other words, the cladding may have a stackable outer geometry.

A "tileable" shape is a polygonal shape which allows the preforms to be stacked together without gaps between preforms in the stack. In other words, a tileable shape is a shape which tessellates. Illustrative examples of tileable shapes include triangles, squares, rectangles, and hexagons. The tileable shape may be a tileable regular polygon, e.g. a square, equilateral triangle, or regular hexagon.

Tileable preforms may be stacked together quickly and repeatably, since the preforms may be easier to align. This may allow for more accurate positioning of the cores. Since the preforms will be in very close contact, gaps, voids or gas bubbles in the optical fibre may be avoided.

The optical fibre preforms may be manufactured by any appropriate technique. Illustrative examples include wet-spinning, melt-spinning, dry spinning, photopolymerization, co-extrusion, rod-in-tube processes, 3D printing, moulding, and interfacial polymerization of cladding material around a core. Of these techniques, co-extrusion may be preferred. Co-extrusion may allow the shape of the preform to be controlled by performing the extrusion through an appropriately-shaped die. Co-extrusion may be performed under ambient air, with clean-room handling being optional, as will be explained later with reference to FIG. 3.

Subsequently, at block 102, the optical fibre preforms are arranged in a stack. In other words, a plurality of optical fibre preforms are placed adjacent to one another, with the cores of the optical fibre preforms being oriented parallel to one another.

The preforms in the stack may have identical shapes and dimensions.

Where optical fibre preforms with tileable shapes are used, the stack may be substantially free of gaps between adjacent optical fibre preforms. The preforms may sit flush next to one another.

Where optical fibre preforms of other shapes are used, the preforms may be close-packed, in other words, arranged in such a way as to minimize the volume of empty space between preforms.

Arranging the optical fibre preforms may comprise inserting the preforms into a supporting frame which surrounds the outer edge of the stack.

The stack may be oriented in any direction with respect to gravity: horizontally, vertically, or at any angle therebetween.

Figure 2:
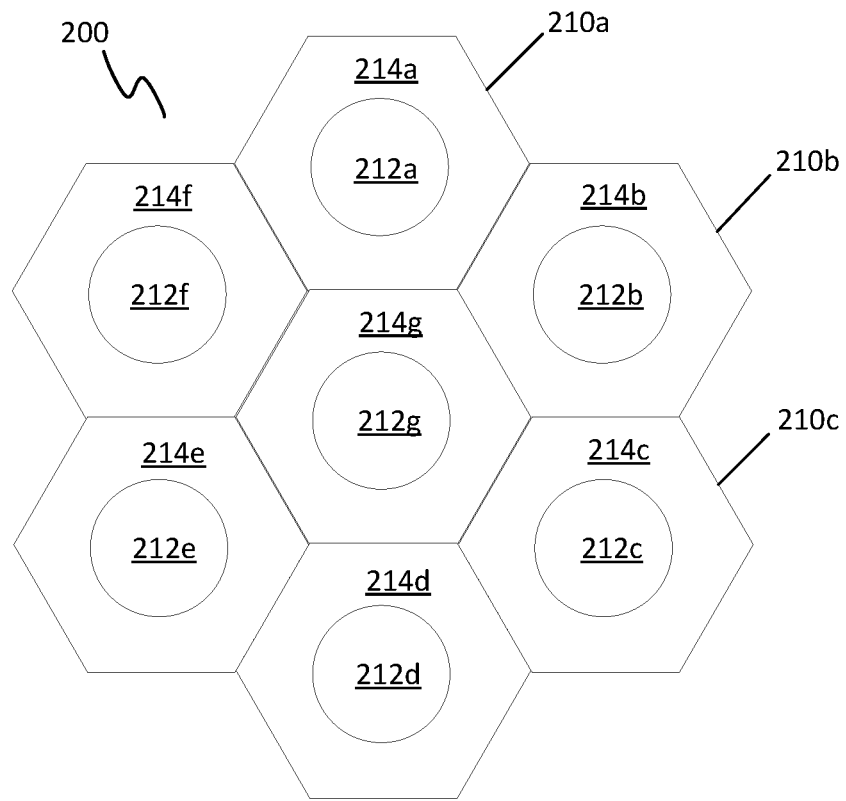
FIG. 2 is a schematic cross-sectional view of an example stack of optical fibre preforms.

An example stack 200 of tileable optical fibre preforms 210 is illustrated in FIG. 2. Each optical fibre preform 210a, 210b, 210c has a respective core 212a, 212b, 212c surrounded by cladding 214a, 214b, 214c. The preforms are tiled: arranged adjacent to one another, without gaps between preforms.

The preforms 210 of this example have hexagonal outer cross sections. The cores 212 have circular cross-sections. Typically, optical fibres have circular cores. Providing preforms with circular cores may therefore allow less stringent manufacturing conditions to be used. When the preform core geometry is the same as the target fibre core geometry, reflow of the core material during fibre drawing, e.g. to circularise the cores, may be avoided.

At block 103, the stack is drawn and bonded to form a multi-core polymer optical fibre. The drawing and bonding may occur simultaneously.

Drawing and bonding the stack may comprise a thermal fibre drawing process. Drawing and bonding the stack may comprise heating the stack to soften the cores and the cladding, and tensioning the softened stack. This stretches the preforms, increasing their length while reducing their thickness. At the same time, adjacent preforms are forced towards one another. Since the cladding is in a softened state, adjacent preforms become fusion bonded. This yields a multi-core polymer optical fibre having a plurality of cores held together by a unitary portion of cladding material.

When gaps are present between preforms, reflow of the cladding material may occur during the drawing and bonding process. Such reflow may fill the gaps.

Thermal bonding of the preforms may allow the multi-core polymer optical fibre to be manufactured rapidly. Chemical bonding of preforms, and chemical softening of preforms to facilitate drawing, are in principle possible.

After drawing and bonding the multi-core optical fibre, one or more optional post-processing operations may be performed. As one example, a protective jacket may be arranged around the multi-core polymer optical fibre, as illustrated in block 104 of FIG. 1.

Another example of a post-processing operations is cutting the multi-core polymer optical fibre to a desired length. Cutting optical fibres with silica cores typically requires the use of a diamond-edged scribe to weaken the fibre at a desired location, followed by the use of a specialised cleaving device to complete the cut. This is time-consuming, and safety precautions must be taken to avoid e.g. eye injury since the cutting process can cause hard, sharp silica fragments to be expelled. In contrast, polymer optical fibres may be cut using an ordinary blade, cable cutter or the like.

Still another example of a post-processing operation is adding a termination to one or both ends of the multi-core optical fibre, to allow easier connection of the multi-core polymer optical fibre to any device.

In implementations where one or both of the core and the cladding includes a dopant, the post-processing operations may include causing diffusion of the dopant to generate a continuous concentration gradient of the dopant. This is one route for obtaining a graded index polymer optical fibre. Diffusion may be caused by heating the multi-core optical fibre, or by soaking the multi-core optical fibre in an appropriate solvent and then drying the fibre to remove the solvent. Heating may be faster, may be performed simultaneously to fibre drawing, and may allow for fibres with better optical properties to be obtained. In some implementations, diffusion of the dopant may occur during the drawing and bonding process, without a separate post-processing operation.

It has been found that, by providing cladding which is doped with a low refractive index species and causing diffusion of the low refractive index species from the cladding into the core, a polymer optical fibre having lower light attenuation may be obtained. In such implementations, the core may be undoped, i.e. may consist of a core polymer, before the diffusion process.

A "low refractive index species" in this context is a compound which has a refractive index lower than that of the material used to form the core.

Various modifications may be made to the described method.

The illustrated optical fibre preforms have circular cores. The core may have any appropriate shape.

The illustrated optical fibre preforms have hexagonal outer cross-sections. Other tileable shapes may alternatively be used. A still further possibility is to use preforms with non-tileable shapes, e.g. with preforms with circular outer cross-sections.

The preforms of the illustrated example have a single layer of cladding. The use of preforms which include two or more layers of cladding is also contemplated. Providing multiple layers of cladding may be useful if, for example, a multi-core graded-index optical fibre is desired.

FIG. 2 illustrates a definitive material boundary between the core and the cladding. A definitive material boundary may not necessarily be present. For example, preforms for forming a graded-index optical fibre may include a dopant distributed on a continuous concentration gradient, with the concentration of the dopant varying as a function of radial position in the preform.

Manufacturing the optical fibre preforms or forming the stack may further comprising dusting the outer surface of the cladding with a particulate material. The particulate material may be used to form a light-attenuating barrier between adjacent cores, as described in more detail below with reference to FIG. 3.

The illustrated stack of optical fibre preforms includes 7 preforms. Stacks may more generally comprise at least 2 preforms, optionally at least 10 preforms, further optionally at least 50 preforms. There is no particular upper limit on the number of preforms which may be included in the stack, provided that the stack is compatible with a fibre drawing process. The manufacture of multi-core optical fibres having 100 or more, optionally 256 or more cores is contemplated.

Typically, the stack consists of preforms which are identical to one another in terms of their cross-sectional shape and their dimensions. Using identical preforms may allow for easier stacking of the preforms. The use of preforms of different configurations is possible in principle. The use of a combination of preforms of two or more different shapes which are tileable collectively but which are not necessarily tileable individually is contemplated. For example, preforms having regular octagonal cross-sections may be stacked together with preforms having square cross-sections.

Typically, the stack consists of the optical fibre preforms. In some implementations, the stack may include polymer spacers. A spacer is a rod which may consist of an optionally-doped polymer, and does not have a core and cladding. For example, regular octagonal preforms may be stacked together with square spacers.

The post-processing operations are optional and may be omitted. Any one of the post-processing operations may be performed, or two or more post-processing operations may be performed in any appropriate combination.

Figure 3:
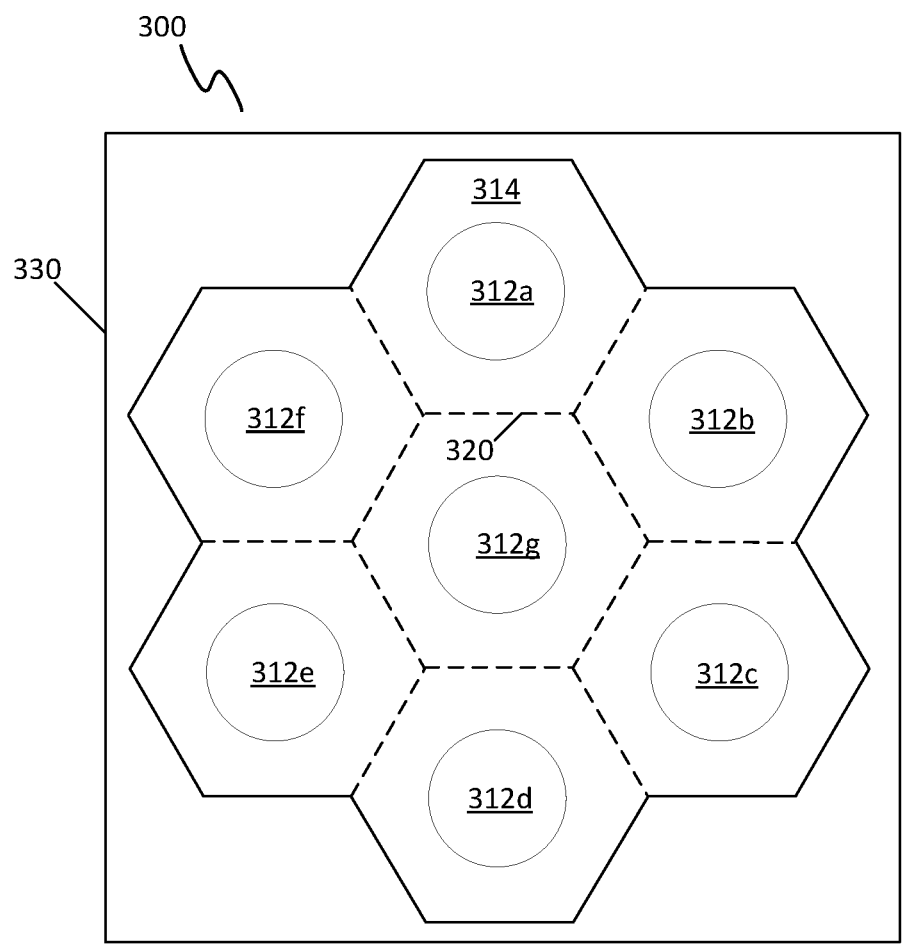
FIG. 3 is a schematic cross-sectional view of an example multi-core polymer optical fibre.

An example multi-core polymer optical fibre 300 obtainable by the method of FIG. 1 will now be described with reference to FIG. 3. FIG. 3 is a schematic cross-section of the multi-core polymer optical fibre.

The multi-core polymer optical fibre 300 includes a plurality of cores 312a . . . g embedded in a unitary portion of cladding material 314. By forming the multi-core polymer optical fibre from a stack of tileable preforms, equal spacings between cores may be reliably obtained.

The cladding 314 may have particulate material embedded therein. The particulate material may comprise impurities, e.g. dust or dirt. The particulate matter may accumulate in particular on the outer surfaces of the preforms before or during the formation of the stack.

Particulates typically do not migrate far during the subsequent manufacturing steps. Thus, in the finished optical fibre, the impurities will tend to remain at the former locations of the edges of the preforms, identified in FIG. 3 by dotted line 320.

In a conventional polymer optical fibre, the presence of particulates is undesirable. This is because particulate impurities scatter light, increasing the attenuation of the optical fibre. Attenuation, also referred to as transmission loss, is the reduction in intensity of a light beam as a function of distance travelled through the optical fibre. In a fibre optic communication system, attenuation constrains the maximum length of the optical fibre, the minimum transmitter power, and the minimum detector sensitivity.

However, in the multi-core optical fibres provided herein, the particulates may serve a useful purpose. The portion of the cladding which is immediately adjacent to the cores is substantially free of the particulate matter, and the particulate matter is concentrated far away from the cores at the locations 320 of the former boundaries between the preforms. Consequently, the particulate matter has very little impact on the signal passing through a single core, for example core 312a. However, light passing between cores, e.g. from core 312a to core 312b, must cross line 320 and is therefore attenuated by the particulate matter in that region. The particulate matter thus reduces crosstalk between adjacent signal paths.

Therefore, handling the optical fibre preforms in a cleanroom is unnecessary because the accumulation of dust or dirt on the surfaces of the preforms may not be harmful. The preforms may be produced by, for example, conventional polymer extrusion processes without special handling. This may reduce manufacturing costs.

It is contemplated that particulate material may be applied intentionally to the outer surfaces of the preforms before forming the stack to provide a light scattering barrier between adjacent cores. In such implementations, the nature of the particulate material is not particularly limited. One example of particulate material is powdered carbon.

FIG. 3 further illustrates a jacket 330 arranged around the outer edge of the cladding 314. The jacket 330 is an optional component which provides physical protection for the cladding 314 and cores 312. The nature of the jacket 330 is not particularly limited and may be selected as appropriate.

When the optical fibre is connected to a device, the cores of the optical fibre must be aligned with the transmitters/receivers of the device. The optical fibre must be correctly positioned in the horizontal and vertical directions and must have the correct rotational orientation, such that the positions of the cores correspond to positions of the transmitters/receivers.

In the illustrated example, the multi-core polymer optical fibre 300 has a rectangular outer cross-section. A rectangle has rotational symmetry of order 2. By configuring the outer cross-section of the optical fibre to have a shape with a low order of rotational symmetry, e.g. an order of rotational symmetry in the range 1 to 4, rotational alignment of the multi-core optical fibre may be made easier. This may allow the multi-core optical fibre to be installed without necessarily requiring the use of an active alignment procedure.

Various modifications may be made to the illustrated multicore polymer optical fibre.

FIG. 3 illustrates a multicore optical polymer fibre obtainable from preforms having hexagonal cross-sections. This is reflected by the position of the boundary 320 at which the particulate material is concentrated. When differently-shaped preforms are used, the configuration of boundary 320 will change accordingly.

The illustrated example has a total of seven cores. In practice, the total number of cores is not particularly limited and may be selected as desired depending on the use case for the optical fibre.

For ease of representation, FIG. 3 illustrates a definitive boundary between the cores 312 and the cladding 314. A step-index multi-core polymer optical fibre may have such a boundary. Graded-index optical fibres, which may have a continuous transition between the core and the cladding, are also contemplated.

FIG. 3 illustrates multi-core optical fibre formed from preforms having a single layer of cladding. Variants may have two or more layers of cladding.

It will be appreciated that the above embodiments have been described by way of example only.

More generally, according to one aspect disclosed herein, there is provided a method of fabricating a multi-core polymer optical fibre. The method comprises: arranging optical fibre preforms in a stack, the optical fibre preforms each comprising a polymer core and polymer cladding surrounding the polymer core; and drawing and bonding the stack to form the multi-core polymer optical fibre. Any contaminants or impurities which collect on outer surfaces of the preforms may be confined to boundaries between the preforms, which may avoid attenuation of signals passed through the cores while at the same time reducing crosstalk between cores of the final manufactured fibre.

The optical fibre preforms have outer cross-sectional shapes which are tileable. Stacking tileable preforms may allow for reliable positioning of the cores in the multi-core optical fibre.

Alternatively, preforms of other shapes may be used. In such implementations, drawing and bonding the stack may further comprise reflowing the polymer cladding to fill any gaps between preforms.

Particulate matter may be arranged on the surface of the optical fibre preforms. The particulate matter may comprise dust or other impurities, and/or may be added intentionally to the surfaces of the preforms. In the finished multi-core polymer optical fibre, the particulate matter may be localised in regions which are between cores and which are spaced from the cores by cladding material free of the particulate matter. The particulate matter may reduce cross-talk between signals passing through adjacent ones of the cores.

Each optical fibre preform may have a single polymer core. Processes for producing single-core optical fibre preforms which have been optimized to minimize contamination close to the core region are available. Using such preforms may allow a multi-core optical fibre with reduced attenuation to be obtained.

The cores of the optical fibre preforms may have circular cross-sections. An optical fibre having circular cores may be desired. Fabrication of the multi-core optical fibre may be simplified by using preforms with cores having a geometry which is the same as the target geometry of the cores in the finished fibre.

Each of the optical fibre preforms may have an identical outer cross-sectional shape. This may allow for easy stacking of the optical fibre preforms.

The outer cross-sectional shapes of the optical fibre preforms may be configured to allow the optical fibre preforms to be stacked together without gaps between the preforms. For example, the outer cross-sectional shapes of the optical fibre preforms may be selected from triangular, rectangular, square, and hexagonal.

Each optical fibre preform may further comprise particulate material on an outer surface of the optical fibre preform. The particulate material may be, for example, dust or dirt accumulated on the surfaces of the preform. Alternatively or additionally, particulate material may be added to the surfaces of the preforms intentionally. If present, particulate matter becomes embedded in the optical fibre during the drawing and bonding. The particulate matter is localised at the positions of the boundaries between preforms.

Particulate matter attenuates light signals by scattering the light. The particulate matter may reduce cross-talk between adjacent cores.

The method may further comprise, before the stacking, manufacturing the optical fibre preforms by extrusion. Extrusion is a convenient technique for manufacturing optical fibre preforms of arbitrary shape, since the shape may be controlled through the use of an appropriate die.

The cladding may comprise a thermoplastic. In such implementations, the bonding may be fusion bonding. This may allow the preforms to be bonded without the use of a binder or adhesive.

The drawing and bonding may be by thermal fibre drawing.

The number of preforms in the stack is not particularly limited and may be selected as appropriate. For example, the stack may include at least 64 optical fibre preforms, optionally at least 256 optical fibre preforms.

The cladding may include a dopant. In such implementations, the method may further comprise causing diffusion of the dopant from the cladding into the core. The diffusion may occur during the drawing and bonding of the stack. This may allow a graded-index polymer optical fibre with low light attenuation to be obtained.

The multi-core polymer optical fibre may have an outer cross-sectional shape with an order of rotational symmetry of less than or equal to 4. For example, the multi-core polymer optical fibre may have an outer cross-sectional shape having an order of rotational symmetry of 1. This may allow for easier rotational alignment of the cores with transmitters/receivers during installation of the optical fibre.

The method may further comprise applying a jacket to the multi-core polymer optical fibre. The jacket may protect the core and cladding from physical damage. Additionally or alternatively, the method may further comprise affixing a termination to an end of the multi-core polymer optical fibre. Terminations may be affixed to both ends of the multi-core polymer optical fibre.

In another aspect, the present disclosure provides a multi-core polymer optical fibre comprising cores embedded in cladding. The multi-core polymer optical fibre further comprises particulate material embedded in the cladding. Each of the cores is surrounded by respective first and second regions of cladding. The first region is substantially free of the particulate material. The second region is spaced from the core by the first region. The second region includes the particulate material. At least part of the second region is arranged between the core and one or more adjacent cores. The multi-core polymer optical fibre is obtainable by the methods provided herein. The particulate material may reduce crosstalk between adjacent ones of the cores.

The multi-core polymer optical fibre may be a step-index optical fibre. Alternatively, the multi-core polymer optical fibre may be a graded-index multi-core polymer optical fibre.

The multi-core polymer optical fibre may have an outer cross-sectional shape with an order of rotational symmetry of less than or equal to 4. In particular, the multi-core polymer optical fibre may have an outer cross-sectional shape with an order of rotational symmetry of 1. Providing an optical fibre with a low degree of rotational symmetry may allow for easier rotational alignment of the cores with transmitters/receivers during installation of the optical fibre.

The cores of the multi-core polymer optical fibre may have circular cross-sections.

The present disclosure provides the following Clauses:

Clause 1. A method of fabricating a multi-core polymer optical fibre, which method comprises:
  arranging optical fibre preforms in a stack, the optical fibre preforms each comprising a polymer core and polymer cladding surrounding the polymer core; and
  drawing and bonding the stack to form the multi-core polymer optical fibre.

Clause 2. The method according to Clause 1, wherein the optical fibre preforms have outer cross-sectional shapes which are tileable.

Clause 3. The method according to Clause 2, wherein the outer cross-sectional shapes are selected from triangular, rectangular, square, and hexagonal.

Clause 4. The method according to any preceding Clause, wherein particulate matter is arranged on surfaces of the optical fibre preforms.

Clause 5. The method according to any preceding Clause, wherein the cladding comprises a thermoplastic and the bonding is fusion bonding.

Clause 6. The method according to any preceding Clause, wherein each optical fibre preform has a single polymer core.

Clause 7. The method according to any preceding Clause, wherein the polymer cores of the optical fibre preforms have circular cross-sections.

Clause 8. The method according to any preceding Clause, wherein each of the optical fibre preforms has an identical outer cross-sectional shape.

Clause 9. The method according to any preceding Clause, wherein each optical fibre preform further comprises particulate material on an outer surface of the optical fibre preform.

Clause 10. The method according to any preceding Clause, further comprising, before the stacking, manufacturing the optical fibre preforms by extrusion.

Clause 11. The method according to any preceding Clause, wherein the stack includes at least 64 optical fibre preforms.

Clause 12. The method according to any preceding Clause, wherein the cladding includes a dopant, and wherein the method further comprises causing diffusion of the dopant from the cladding into the core.

Clause 13. The method according to Clause 12, wherein the diffusion occurs during the drawing and bonding of the stack.

Clause 14. The method according to any preceding Clause, wherein the multi-core polymer optical fibre has an outer cross-sectional shape with an order of rotational symmetry of less than or equal to 4.

Clause 15. The method according to any preceding Clause, further comprising, after the drawing and bonding, applying a jacket to the multi-core polymer optical fibre.

Clause 16. The method according to any preceding Clause, further comprising, after the drawing and bonding, affixing a termination to an end of the multi-core polymer optical fibre.

Clause 17. A multi-core polymer optical fibre obtainable by the method of any preceding Clause.

Clause 18. A multi-core polymer optical fibre comprising cores embedded in cladding, wherein:
  the multi-core polymer optical fibre further comprises particulate material embedded in the cladding;
  each of the cores is surrounded by respective first and second regions of cladding,
    the first region being substantially free of the particulate material,
    the second region being spaced from the core by the first region,
    the second region including the particulate material, and
    at least part of the second region being arranged between the core and one or more adjacent cores.

Clause 19. The multi-core polymer optical fibre according to Clause 18, which is a graded-index multi-core polymer optical fibre.

Clause 20. The multi-core polymer optical fibre according to Clause 18 or Clause 19, having an outer cross-sectional shape with an order of rotational symmetry of less than or equal to 4.

Clause 21. The multi-core polymer optical fibre according to Clause 18, having an outer cross-sectional shape with an order of rotational symmetry of 1.

Clause 22. The multi-core polymer optical fibre according to any of Clauses 16 to 19, wherein the cores have circular cross-sections.

Clause 23. An optical fibre preform comprising a polymer core and polymer cladding surrounding the polymer core, wherein the optical fibre preform has an outer cross-sectional shapes which is tileable.

Other variants or use cases of the disclosed techniques may become apparent to the person skilled in the art once given the disclosure herein. The scope of the disclosure is not limited by the described embodiments but only by the accompanying claims.

The invention claimed is:

1. A method of fabricating a multi-core polymer optical fibre, which method comprises:
  arranging optical fibre preforms in a stack, the optical fibre preforms each comprising a polymer core and polymer cladding surrounding the polymer core; and
  drawing and bonding the stack to form the multi-core polymer optical fibre resulting in impurities collected on surfaces of the optical fibre preforms being confined to boundaries between the optical fibre preforms.

2. The method according to claim 1, wherein the optical fibre preforms have outer cross-sectional shapes which are tileable.

3. The method according to claim 2, wherein the outer cross-sectional shapes are selected from triangular, rectangular, square, and hexagonal.

4. The method according to claim 1, wherein the impurities comprise particulate matter.

5. The method according to claim 1, wherein the cladding comprises a thermoplastic and the bonding is fusion bonding.

6. The method according to claim 1, wherein each optical fibre preform has a single polymer core.

7. The method according to claim 1, wherein the polymer cores of the optical fibre preforms have circular cross-sections.

8. The method according to claim 1, wherein each of the optical fibre preforms has an identical outer cross-sectional shape.

9. The method according to claim 1, wherein the cladding includes a dopant, and wherein the method further comprises causing diffusion of the dopant from the cladding into the core.

10. The method according to claim 9, wherein the diffusion occurs during the drawing and bonding of the stack.

11. The method according to claim 1, wherein the multi-core polymer optical fibre has an outer cross-sectional shape with an order of rotational symmetry of less than or equal to 4.

12. The method according to claim 1, wherein the impurities comprise one or more of: a dust, a dirt, a powder, and a contaminant.

13. The method according to claim 1, wherein the method is performed without use of a cleanroom.

14. A multi-core polymer optical fibre comprising cores embedded in cladding, wherein:
  the multi-core polymer optical fibre further comprises impurities embedded in the cladding; and
  each of the cores is surrounded by respective first and second regions of cladding,
    the first region being substantially free of the impurities,
    the second region being spaced from the core by the first region, and
    the second region including the impurities at a location of a former boundary, and
    between the second region of the cladding of the core and the second region of the cladding of one or more adjacent cores.

15. The multi-core polymer optical fibre according to claim 14, which is a graded-index multi-core polymer optical fibre.

16. The multi-core polymer optical fibre according to claim 14, having an outer cross-sectional shape with an order of rotational symmetry of less than or equal to 4.

17. The multi-core polymer optical fibre according to claim 16, having an outer cross-sectional shape with an order of rotational symmetry of 1.

18. The multi-core polymer optical fibre according to claim 14, wherein the cores have circular cross-sections.

19. The multi-core polymer optical fibre according to claim 14, wherein the impurities are concentrated at locations of former boundaries between optical fibre preforms.

20. A method of fabricating a multi-core polymer optical fibre, which method comprises:
  arranging optical fibre preforms in a stack, the optical fibre preforms each comprising a polymer core and polymer cladding surrounding the polymer core; and
  drawing and bonding the stack to form the multi-core polymer optical fibre, wherein drawing and bonding the stack comprises embedding particulate matter in the polymer cladding resulting in impurities collected on outer surfaces of the optical fibre preforms being confined to boundaries between the optical fibre preforms.

\* \* \* \* \*